UNITED STATES PATENT OFFICE.

SIMON HACKELBERG, OF BRUSSELS, BELGIUM.

COMPOSITION FOR PROTECTING PANES OF GLASS.

SPECIFICATION forming part of Letters Patent No. 632,014, dated August 29, 1899.

Application filed March 9, 1899. Serial No. 708,396. (No specimens.)

*To all whom it may concern:*

Be it known that I, SIMON HACKELBERG, a subject of the King of Belgium, residing at Brussels, Belgium, have invented certain new and useful Improvements in Compositions for Protecting Panes of Glass, of which the following is a specification.

It is known that windows of shops are covered with vapor when the interior temperature sensibly differs from the exterior temperature and that this vapor is transformed into hoar-frost when the outer temperature is sufficiently low. This condition is very disagreeable to shop-keepers, for it prevents the public from seeing the goods which are exposed in the windows. To overcome these conditions, I have invented a composition to prevent the deposit of vapors and frost on the glass. This composition consists of water, glycerin, sugar, and cumarin in the desired proportions, which are approximately as follows: water, thirty parts; glycerin, sixty parts; sugar, nine parts, and cumarin one part.

The composition is applied in a thin transparent crystalline coat on the window-glasses, so as not to be distinguishable to the eye from the untreated glass. The chemical action of the composition is such that formation of vapor or hoar-frost is entirely prevented.

Having fully described my invention, what I claim, and desire to secure by Letters Patent, is—

A composition of matter to prevent the deposit of vapor and hoar-frost on window-glass, said composition consisting of water, glycerin, sugar and cumarin in the proportions substantially as herein set forth.

SIMON HACKELBERG.

Witnesses:
 AD SPURM,
 GREGORY PHELAN.